US012381313B2

(12) United States Patent
Wei et al.

(10) Patent No.: US 12,381,313 B2
(45) Date of Patent: Aug. 5, 2025

(54) ANTENNA STRUCTURE AND ELECTRONIC DEVICE

(71) Applicant: WISTRON NEWEB CORPORATION, Hsinchu (TW)

(72) Inventors: Shih-Chiang Wei, Hsinchu (TW); Yung-Chieh Yu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 221 days.

(21) Appl. No.: 18/321,028

(22) Filed: May 22, 2023

(65) Prior Publication Data

US 2024/0113424 A1 Apr. 4, 2024

(30) Foreign Application Priority Data

Oct. 3, 2022 (TW) .................................. 111137466

(51) Int. Cl.
*H01Q 5/328* (2015.01)
*H01Q 1/22* (2006.01)
*H01Q 1/48* (2006.01)

(52) U.S. Cl.
CPC ............. *H01Q 1/48* (2013.01); *H01Q 1/2266* (2013.01); *H01Q 5/328* (2015.01)

(58) Field of Classification Search
CPC ........ H01Q 1/48; H01Q 1/2266; H01Q 5/328; H01Q 5/321; H01Q 9/26; H01Q 9/42; H01Q 5/392
See application file for complete search history.

(56) References Cited

U.S. PATENT DOCUMENTS

| | | | | |
|---|---|---|---|---|
| 9,054,420 | B2 * | 6/2015 | Chung | H01Q 21/28 |
| 9,203,154 | B2 * | 12/2015 | Korva | H01Q 9/04 |
| 9,391,362 | B1 * | 7/2016 | Kim | H01Q 5/385 |
| 10,454,156 | B1 * | 10/2019 | Yang | H01Q 1/48 |
| 11,128,050 | B1 * | 9/2021 | Chuang | H01Q 5/371 |
| 2004/0116157 | A1 * | 6/2004 | Vance | H01Q 1/243<br>455/562.1 |
| 2004/0119651 | A1 * | 6/2004 | Leclerc | H01Q 5/371<br>343/702 |
| 2006/0152411 | A1 * | 7/2006 | Iguchi | H01Q 9/42<br>343/702 |
| 2006/0170600 | A1 * | 8/2006 | Korva | H01Q 9/0421<br>343/702 |

(Continued)

*Primary Examiner* — Dameon E Levi
*Assistant Examiner* — Jordan E. DeWitt
(74) *Attorney, Agent, or Firm* — McClure, Qualey & Rodack, LLP

(57) ABSTRACT

An antenna structure and an electronic device are provided. The electronic device includes a housing and the antenna structure disposed in the housing. The antenna structure includes a grounding element, a feeding radiation element, a feeding element, a first grounding radiation element, and a switching element. The feeding radiation element includes a first radiating portion, a second radiating portion, and a third radiating portion. The first radiating portion and the second radiating portion jointly surround the first grounding radiation element. The first radiating portion and the first grounding radiation element are separate from each other and coupled with each other. The switching element is electrically connected to the first grounding radiation element.

20 Claims, 10 Drawing Sheets

(56) References Cited

U.S. PATENT DOCUMENTS

2007/0229376 A1* 10/2007 Desclos ................. H01Q 1/273 343/718
2007/0273606 A1* 11/2007 Mak ....................... H01Q 1/243 343/876
2008/0136711 A1* 6/2008 Lai ......................... H01Q 5/392 343/700 MS
2009/0168847 A1* 7/2009 Tornatta ................. H04B 1/713 375/136
2010/0207832 A1* 8/2010 Ying .................... H01Q 19/005 343/749
2011/0095949 A1* 4/2011 Wong ....................... H01Q 1/38 343/702
2011/0263289 A1* 10/2011 Vance .................... H01Q 5/371 343/905
2012/0032862 A1* 2/2012 Ying ...................... H01Q 5/385 343/749
2012/0262343 A1* 10/2012 Radojkovic .............. H01Q 5/20 343/702
2012/0299781 A1* 11/2012 Lee .......................... H01Q 9/42 343/700 MS
2013/0038494 A1* 2/2013 Kuonanoja .............. H01Q 9/42 343/745
2013/0257679 A1* 10/2013 Wong ..................... H01Q 5/378 343/876
2015/0097752 A1* 4/2015 Li ............................ H01Q 1/38 343/848
2015/0200457 A1* 7/2015 Chan ...................... H01Q 5/357 343/700 MS
2016/0028150 A1* 1/2016 Chou ..................... H01Q 1/243 343/702
2016/0079656 A1* 3/2016 Tsai ......................... H01Q 9/42 343/750
2016/0164192 A1* 6/2016 Lin ........................ H01Q 5/314 343/749
2016/0276742 A1* 9/2016 Yu ............................ H01Q 1/48
2017/0170547 A1* 6/2017 Huang ..................... H01Q 9/42
2018/0026336 A1* 1/2018 Chen ........................ H04Q 1/48 343/702
2018/0248264 A1* 8/2018 Chen ........................ H01Q 9/40
2019/0052292 A1* 2/2019 Seo ...................... H01Q 9/0421
2024/0113424 A1* 4/2024 Wei ...................... H01Q 1/2266
2024/0266733 A1* 8/2024 Wei ........................ H01Q 5/378

* cited by examiner

ANTENNA STRUCTURE AND ELECTRONIC DEVICE

CROSS-REFERENCE TO RELATED PATENT APPLICATION

This application claims the benefit of priority to Taiwan Patent Application No. 111137466, filed on Oct. 3, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an electronic device, and more particularly to an antenna structure capable of covering multiple frequency bands and an electronic device having the antenna structure.

BACKGROUND OF THE DISCLOSURE

Currently, exterior designs of electronic devices, such as notebook computers, are developed toward being thinner and more lightweight, while needing to maintain high levels of performance. Since there is a tendency for an outer appearance of the notebook computer to be designed with a narrow screen frame, an internal space of the electronic device that is available for placement of an antenna is very limited. Moreover, due to the requirement of having a narrow screen frame on the electronic device, an issue of decreasing and insufficient bandwidth is likely to occur to the antenna.

Therefore, how to design an antenna structure capable of simultaneously transmitting and receiving multiple wireless frequency bands and having good antenna efficiency within the limited internal space of the electronic device has become an important issue to be addressed in the related art.

SUMMARY OF THE DISCLOSURE

In response to the above-referenced technical inadequacy, the present disclosure provides an antenna structure and an electronic device, which can address an issue of the antenna structure not having a sufficient bandwidth due to miniaturization requirements of the electronic device.

In order to solve the above-mentioned problem, one of the technical aspects adopted by the present disclosure is to provide an antenna structure, which includes a grounding element, a feeding radiation element, a feeding element, a first grounding radiation element, and a switching element. The feeding radiation element includes a first radiating portion, a second radiating portion, and a third radiating portion. The first radiating portion is connected to the second radiating portion, the first radiating portion includes a feeding portion and an arm, the third radiating portion is connected to the first radiating portion, the arm extends along a first direction, the third radiating portion extends a second direction, and the first direction is different from the second direction. A grounding end of the feeding element is connected to the grounding element, and a feeding end of the feeding element is connected to the feeding portion or the second radiating portion. The first grounding radiation element is connected to the grounding element, the first radiating portion and the second radiating portion jointly surround the first grounding radiation element, and the first radiating portion and the first grounding radiation element are separate from each other and coupled with each other. The switching element is electrically connected to the first grounding radiation element. When the switching element is switched to a first mode, the first radiating portion and the first grounding radiation element are used to generate a first operating frequency band, and when the switching element is switched to a second mode, the first radiating portion and the first grounding radiation element are used to generate a second operating frequency band, and a central frequency of the first operating frequency band is different from a central frequency of the second operating frequency band.

In order to solve the above-mentioned problem, another one of the technical aspects adopted by the present disclosure is to provide an electronic device, which includes a housing and an antenna structure. The antenna structure is disposed in the housing. The antenna structure includes a grounding element, a feeding radiation element, a feeding element, a first grounding radiation element, and a switching element. The feeding radiation element includes a first radiating portion, a second radiating portion, and a third radiating portion. The first radiating portion is connected to the second radiating portion, the first radiating portion includes a feeding portion and an arm, the third radiating portion is connected to the first radiating portion, the arm extends along a first direction, the third radiating portion extends along a second direction, and the first direction is different from the second direction. A grounding end of the feeding element is connected to the grounding element, and a feeding end of the feeding element is connected to the feeding portion or the second radiating portion. The first grounding radiation element is connected to the grounding element, the first radiating portion and the second radiating portion jointly surround the first grounding radiation element, and the first radiating portion and the first grounding radiation element are separate from each other and coupled with each other. The switching element is electrically connected to the first grounding radiation element. When the switching element is switched to a first mode, the first radiating portion and the first grounding radiation element are used to generate a first operating frequency band, and when the switching element is switched to a second mode, the first radiating portion and the first grounding radiation element are used to generate a second operating frequency band, and a central frequency of the first operating frequency band is different from a central frequency of the second operating frequency band.

Therefore, in the antenna structure and the electronic device provided by the present disclosure, by virtue of "in response to the switching element being switched to a first mode, the first radiating portion and the first grounding radiation element being used to generate a first operating frequency band, and in response to the switching element being switched to a second mode, the first radiating portion and the first grounding radiation element being used to generate a second operating frequency band" and "a central frequency of the first operating frequency band being different from a central frequency of the second operating frequency band," the antenna structure can satisfy requirements of multiple frequency bands despite miniaturization of the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
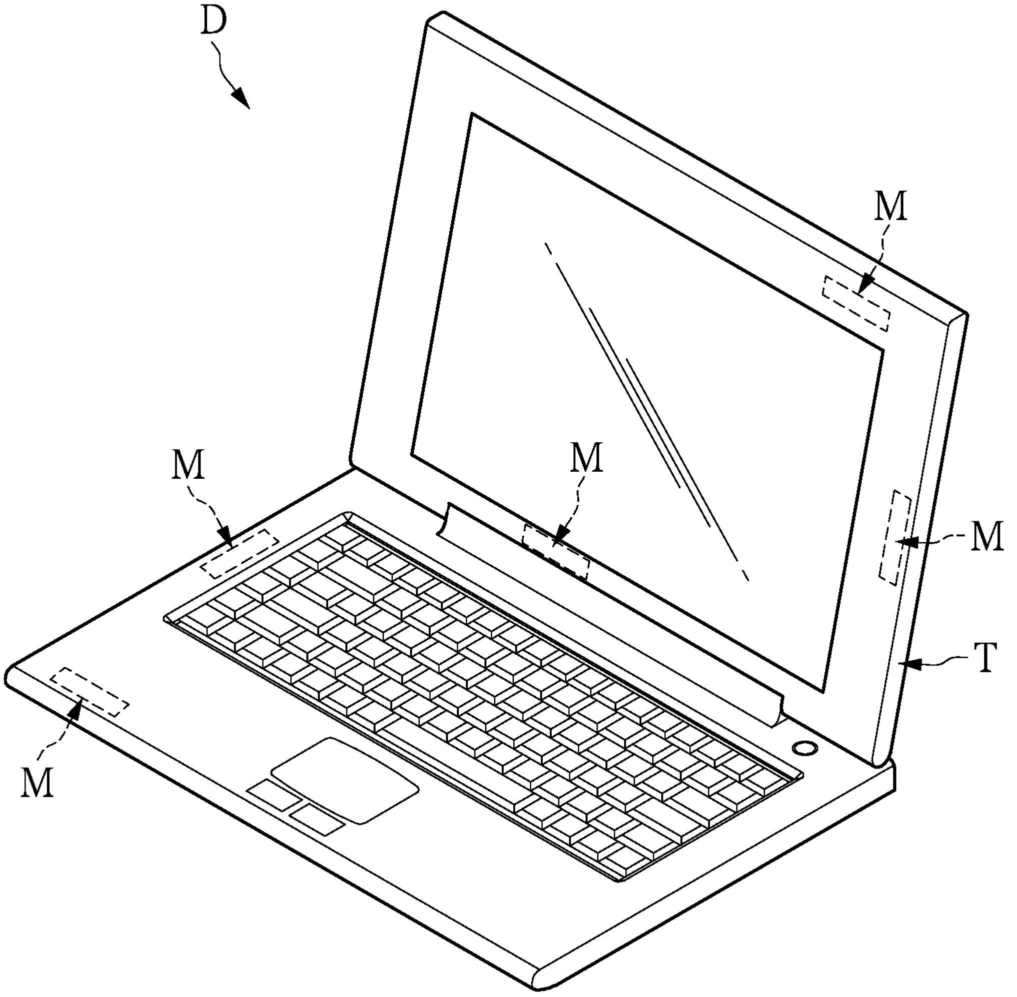
FIG. 1 is a schematic view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Referring to FIG. 1, FIG. 1 is a schematic view of an electronic device according to the present disclosure. The present disclosure provides an electronic device D, and the electronic device D can be a smart phone, a tablet computer, or a notebook computer. However, the present disclosure is not limited thereto. In the present disclosure, the electronic device D is exemplified as the notebook computer. The electronic device D includes an antenna structure M and a housing T (at least one part of the housing T can be a metal housing). The electronic device D can generate at least one operating frequency band through the antenna structure M. For example, the antenna structure M is disposed at a position of a screen frame of the electronic device D, but the position and quantity of the antenna structure M in the electronic device D are not limited in the present disclosure.

First Embodiment

Figure 2:
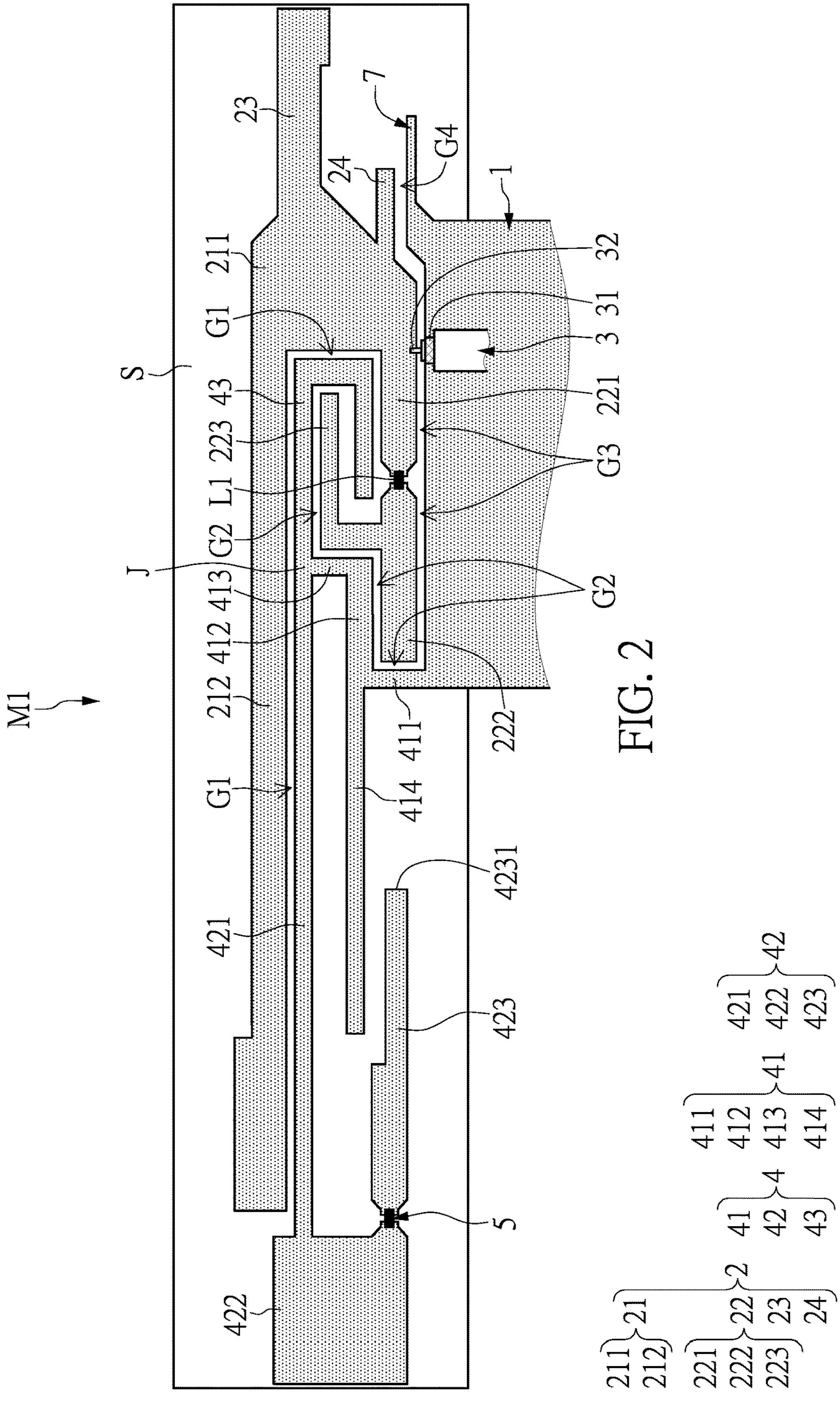
FIG. 2 is a schematic planar view of an antenna structure according to a first embodiment of the present disclosure.

Referring to FIG. 2, FIG. 2 is a schematic planar view of an antenna structure according to a first embodiment of the present disclosure. A first embodiment of the present disclosure provides an antenna structure M1, which includes a grounding element 1, a feeding radiation element 2, a feeding element 3, a first grounding radiation element 4, and a switching element 5. The grounding element 1 is connected to the housing T. The feeding radiation element 2 includes a first radiating portion 21, a second radiating portion 22, and a third radiating portion 23. The first radiating portion 21 is connected to the second radiating portion 22. The first radiating portion 21 includes a feeding portion 211 and an arm 212. The second radiating portion 22 is more adjacent to the grounding element 1 than the arm 212. The third radiating portion 23 is connected to the first radiating portion 21. The arm 212 extends along a first direction (a negative X-axis direction), the third radiating portion 23 extends along a second direction (a positive X-axis direction), and the first direction is different from the second direction.

In continuation of the above, the feeding element 3 includes a grounding end 31 and a feeding end 32, the grounding end 31 is connected to the grounding element 1, and the feeding end 32 is connected to the feeding portion 211 or the second radiating portion 22. In the first embodiment, the feeding end 32 is connected between the feeding portion 211 and the second radiating portion 22. The feeding element 3 is used to feed a signal through the feeding portion 211. The first grounding radiation element 4 is connected to the grounding element 1. As shown in FIG. 2, the first radiating portion 21 and the second radiating portion 22 jointly surround the first grounding radiation element 4. The first radiating portion 21 and the first grounding radiation element 4 are separate from each other and coupled with each other. The switching element 5 is electrically connected to the first grounding radiation element 4.

Still referring to FIG. 2, the antenna structure M1 further includes a first inductor L1. The second radiating portion 22 includes a first branch 221, a second branch 222, and a third branch 223. The first branch 221 is connected to the feeding element 3, and the third branch 223 is connected to the second branch 222. The first inductor L1 is connected between the first branch 221 and the second branch 222. Specifically, the first branch 221 is not directly connected to the second branch 222, but is connected to the second branch 222 through the first inductor L1. An inductance of the first inductor L1 ranges from 1 nH to 6 nH. Preferably, in the present disclosure, the inductance of the first inductor L1 is 2.7 nH. The first grounding radiation element 4 includes a first grounding branch 41, a second grounding branch 42, and a third grounding branch 43. The first grounding branch 41 is connected to the grounding element 1, and the first grounding branch 41, the second grounding branch 42, and the third grounding branch 43 are connected at a connection point J.

Furthermore, the first grounding branch 41 includes a first extension portion 411, a second extension portion 412, a third extension portion 413, and a fourth extension portion 414. The first extension portion 411 is connected to the grounding element 1. The second extension portion 412 is connected between the first extension portion 411 and the third extension portion 413. The third extension portion 413 is connected between the second grounding branch 42 and the third grounding branch 43. The fourth extension portion 414 is connected to the first extension portion 411 and extends along the first direction. The second grounding branch 42 includes a first section 421, a second section 422, and a third section 423. The first section 421 is connected to the connection point J, and the second section 422 is connected between the first section 421 and the third section 423. The third section 423 has an open end 4231. The switching element 5 is connected between the second section 422 and the third section 423.

The first radiating portion 21 is separate from the second grounding branch 42 and the third grounding branch 43 of the first grounding radiation element 4 by a first coupling gap G1. The second radiating portion 22 is separate from the first grounding branch 41 and the third grounding branch 43 of the first grounding radiation element 4 by a second coupling gap G2. The grounding element 1 and the second radiating portion 22 are separate from each other by a third coupling gap G3. A distance of any part of the first coupling gap G1, the second coupling gap G2, and the third coupling gap G3 is smaller than or equal to 3 mm. Moreover, the antenna structure M1 further includes a second grounding radiation element 7. The second grounding radiation element 7 is connected to the grounding element 1. The feeding radiation element 2 further includes a fourth radiating portion 24. The fourth radiating portion 24 is connected to the first radiating portion 21 and is adjacent to the second grounding radiation element 7, and the fourth radiating portion 24 is separate from the second grounding radiation element 7 by a fourth coupling gap G4. A distance of any part of the fourth coupling gap G4 is smaller than or equal to 3 mm.

Figure 3:
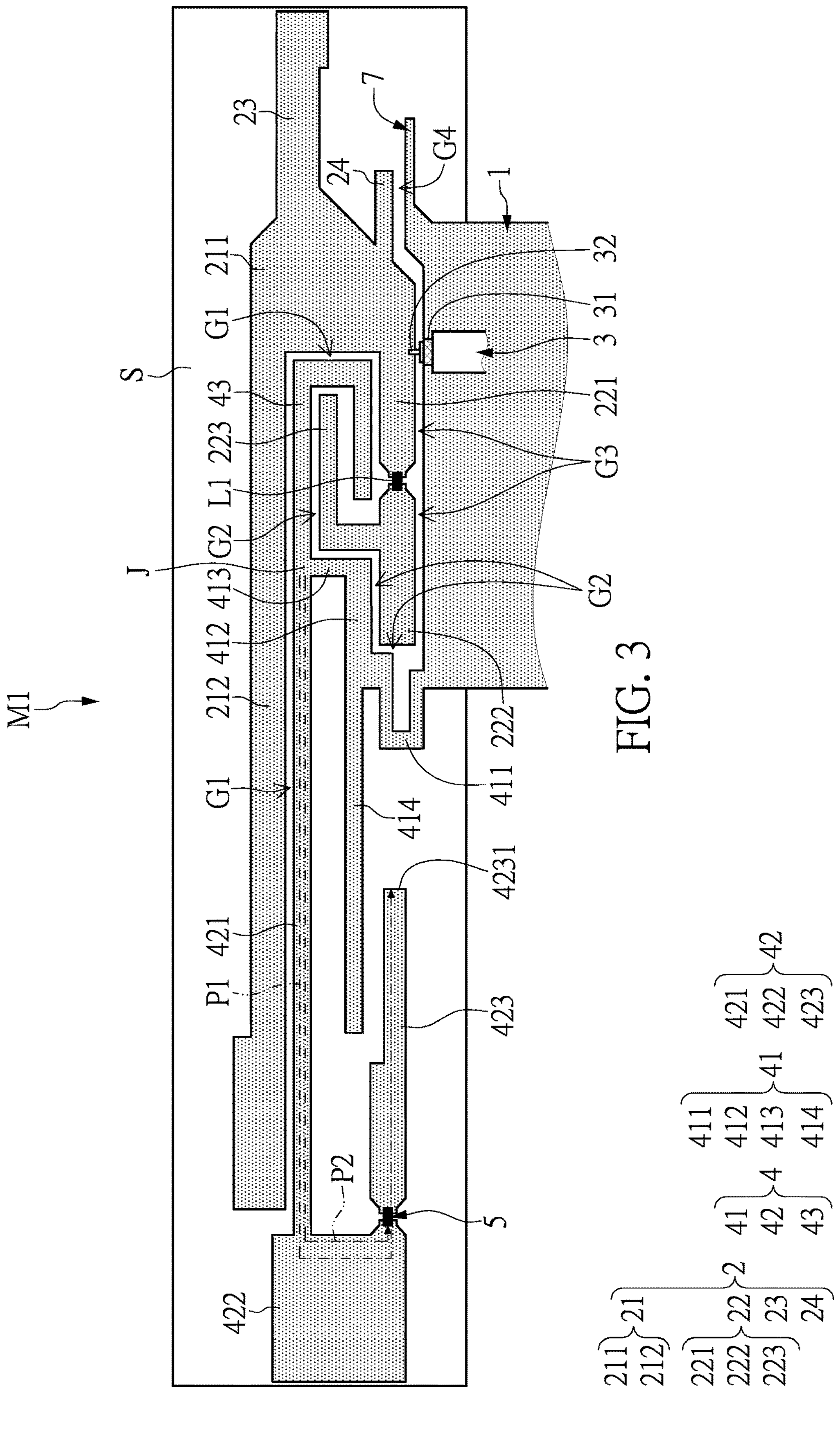
FIG. 3 is a schematic planar view of another configuration of the antenna structure according to the first embodiment of the present disclosure.

Then, referring to FIG. 3, FIG. 3 is a schematic planar view of another configuration of the antenna structure according to the first embodiment of the present disclosure. The antenna structure M1 shown in FIG. 3 has a structure similar to that of the antenna structure M1 shown in FIG. 2, and the similarities will not be reiterated herein. A comparison can be made between FIG. 2 and FIG. 3. Their main difference is that the first extension portion 411 in FIG. 2 is straight, but the first extension portion 411 in FIG. 3 is winding.

Figure 5:
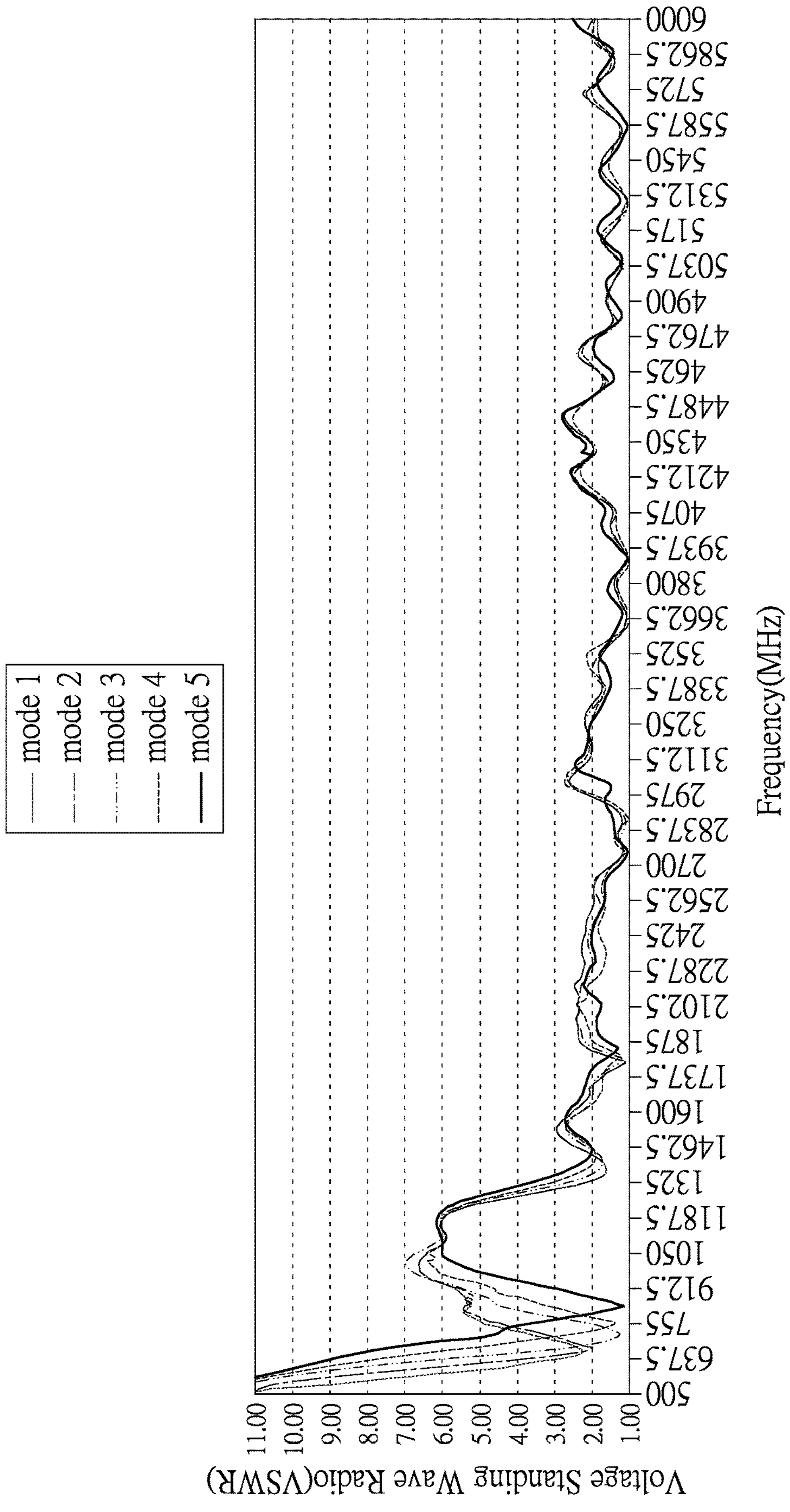
FIG. 5 is a curve diagram showing a voltage standing wave ratio of the antenna structure according to the first embodiment of the present disclosure.

Referring to FIG. 3 and FIG. 5, FIG. 5 is a curve diagram showing a voltage standing wave ratio of the antenna structure according to the first embodiment of the present disclosure. The first radiating portion 21 and the second grounding branch 42 are coupled with each other, and generate a frequency range from 617 MHz to 960 MHz through a switching mechanism of the switching element 5. The first extension portion 411 is coupled with the first branch 221, the second branch 222, and the first inductor L1, and the third branch 223 is coupled with the third grounding branch 43, so as to jointly generate a frequency range from 1,440 MHz to 1,700 MHz. Specifically, the antenna structure M1 can improve impedance and control frequency deviation through changing a shape of the first extension portion 411 (e.g., from a straight shape in FIG. 2 to a winding shape in FIG. 3). Then, the third grounding branch 43 is coupled with the first branch 221, the second branch 222, and the first inductor L1, and the fourth extension portion 414 is excited, so as to jointly generate a frequency range from 1,700 MHz to 2,200 MHz. The third radiating portion 23 is excited to generate a frequency range from 2,200 MHz to 2,700 MHz. The first radiating portion 21 and the second grounding branch 42 are coupled with each other, and the fourth extension portion 414 and the third grounding branch 43 are excited, so as to jointly generate a frequency range from 3,300 MHz to 3,800 MHz. The first radiating portion 21 and the third radiating portion 23 are excited to jointly generate a frequency range from 3,800 MHz to 4,500 MHz. The first branch 221 and the first inductor L1 are excited, and the second grounding radiation element 7 and the fourth radiating portion 24 are coupled with each other, so as to jointly generate a frequency range from 4,500 MHz to 5,500 MHz. The second grounding branch 42 is excited, and the second grounding radiation element 7 and the fourth radiating portion 24 are coupled with each other, so as to jointly generate a frequency range from 5,500 MHz to 6,000 MHz.

Figure 4:
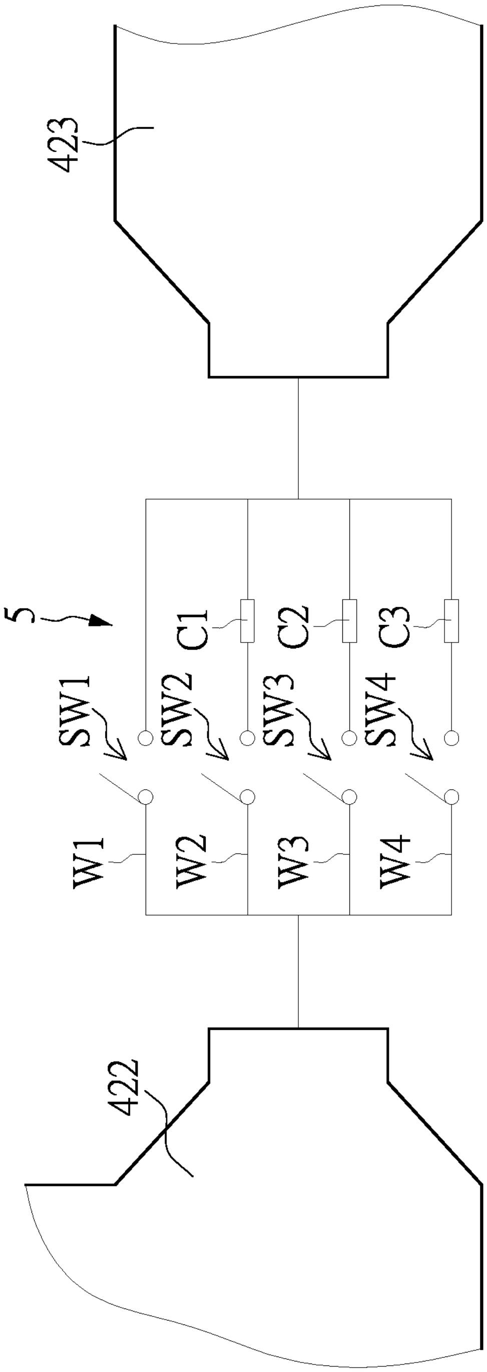
FIG. 4 is a schematic enlarged view of a switching element of the antenna structure according to the first embodiment of the present disclosure.

Referring to FIG. 4, FIG. 4 is a schematic enlarged view of a switching element of the antenna structure according to the first embodiment of the present disclosure. The switching element 5 includes multiple modes, and the multiple modes respectively correspond to multiple conducting paths. Thus, the switching element 5 can be switched to different conducting paths through an open-circuit state or a closed-circuit state of different switches. For example, in the first embodiment, the switching element 5 includes a first conducting path W1, a second conducting path W2, a third conducting path W3, and a fourth conducting path W4. The first conducting path W1 has a first switch SW1. The second conducting path W2 has a second switch SW2 and a first capacitor C1. The third conducting path W3 has a third switch SW3 and a second capacitor C2. The fourth conducting path W4 has a fourth switch SW4 and a third capacitor C3. The first capacitor C1, the second capacitor C2, and the third capacitor C3 are different from each other. For example, a capacitance of the first capacitor C1 is 7 pF, a capacitance of the second capacitor C2 is 1.8 pF, and a capacitance of the third capacitor C3 is 0.7 pF, but the present disclosure is not limited thereto.

Referring to FIG. 3 and FIG. 5, as mentioned above, the antenna structure M1 can generate a low frequency range from 617 MHz to 960 MHz through the switching mechanism of the switching element 5. Specifically, the switching mechanism of the switching element 5 includes a first mode (Mode 1), a second mode (Mode 2), a third mode (Mode 3), a fourth mode (Mode 4), and a fifth mode (Mode 5).

When the switching element 5 is switched to the first mode, the first switch SW1 is in a conducting state, and other switches (SW2 to SW4) are in a non-conducting state. The signal fed by the feeding element 3 will pass a first path P1 through the feeding portion 211. The first path P1 includes the first section 421, the second section 422, and the third section 423 of the second grounding branch 42, and the first conducting path W1 of the switching element 5. Accordingly, the first radiating portion 21 and the second grounding branch 42 are coupled with each other for generating a first operating frequency band in the low frequency range (617 MHz to 960 MHz). In addition, as shown in FIG. 3, the switching element 5 is positioned in the first path P1, and the switching element 5 is more adjacent to the open end 4231 of the third section 423 than the connection point J. In other words, the switching element 5 is positioned between a central point of the first path P1 and the open end 4231. In the present disclosure, the switching element 5 is disposed at a position adjacent to the open end 4231, such that the first radiating portion 21 and the second grounding branch 42 are coupled with each other for generating the operating frequency band with the low frequency range. Further, when the switching element 5 is being switched at the position adjacent to the open end 4231, intermediate-high frequency characteristics of the antenna structure M1 will be less affected.

When the switching element 5 is switched to the second mode, the third mode, and the fourth mode, the second switch SW2, the third switch SW3, and the fourth switch SW4 are in the conducting state, and the first switch SW1 is in the non-conducting state. The signal fed by the feeding element 3 will pass the first path P1 through the feeding portion 211. The first path P1 includes the first section 421, the second section 422, and the third section 423 of the second grounding branch 42, and includes one of the second conducting path W2 (including the first capacitor C1), the third conducting path W3 (including the second capacitor C2), and the fourth conducting path W4 (including the third capacitor C3) of the switching element 5. Accordingly, the first radiating portion 21 and the second grounding branch 42 are coupled with each other for generating a second operating frequency band, a third operating frequency band, and a fourth operating frequency band in the low frequency range (617 MHz to 960 MHz).

When the switching element 5 is switched to the fifth mode, the first switch SW1, the second switch SW2, the third switch SW3, and the fourth switch SW4 are in the non-conducting state. The signal fed by the feeding element 3 will pass the second path P2 through the feeding portion 211. The second path P2 includes the first section 421 and the second section 422 of the second grounding branch 42. In other words, since all switches are in the open-circuit state, the current path through which the signal passes stops upon reaching the switching element 5, thereby causing a length of the second path P2 to be shorter than a length of the first path P1. Accordingly, the first radiating portion 21 and the second grounding branch 42 are coupled with each other for generating a fifth operating frequency band in the low frequency range (617 MHz to 960 MHz).

Furthermore, central frequencies of the first to fifth operating frequency bands are different from each other. As shown in FIG. 5, when the switching element 5 is switched from the first mode to the fifth mode, the central frequencies of the first to fifth operating frequency bands will be gradually adjusted from about 617 MHz to about 960 MHz (from low to high). The antenna structure M1 of the present disclosure can change signal transmission paths by switching among different modes, and through the configuration of different capacitors having different capacitances, the low frequency range can be freely adjusted within the frequency range from 617 MHz to 960 MHz. In this way, the desired low operating frequency band can be generated.

Figure 6:
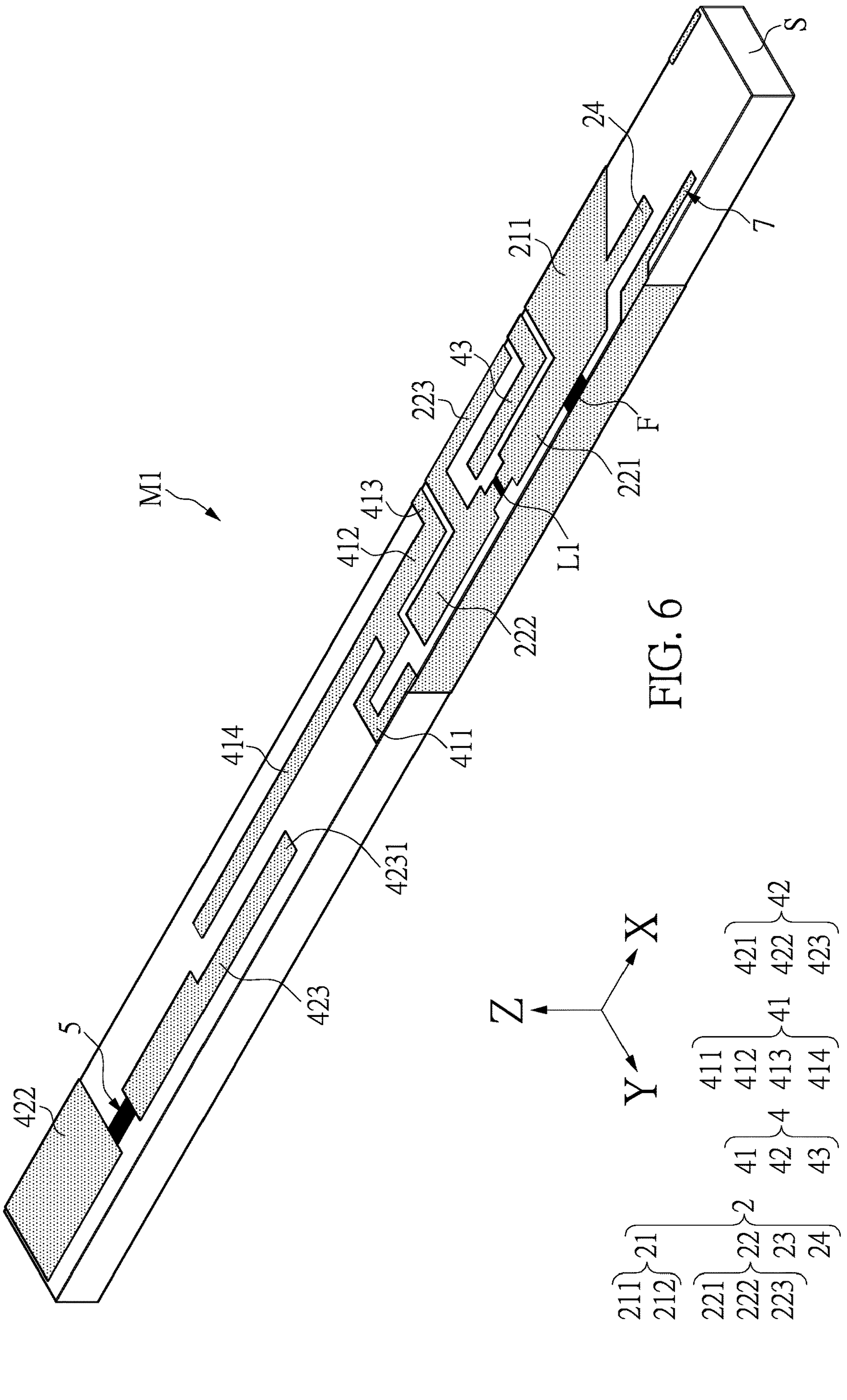
FIG. 6 is a first schematic perspective view of the antenna structure according to the first embodiment of the present disclosure.
Figure 7:
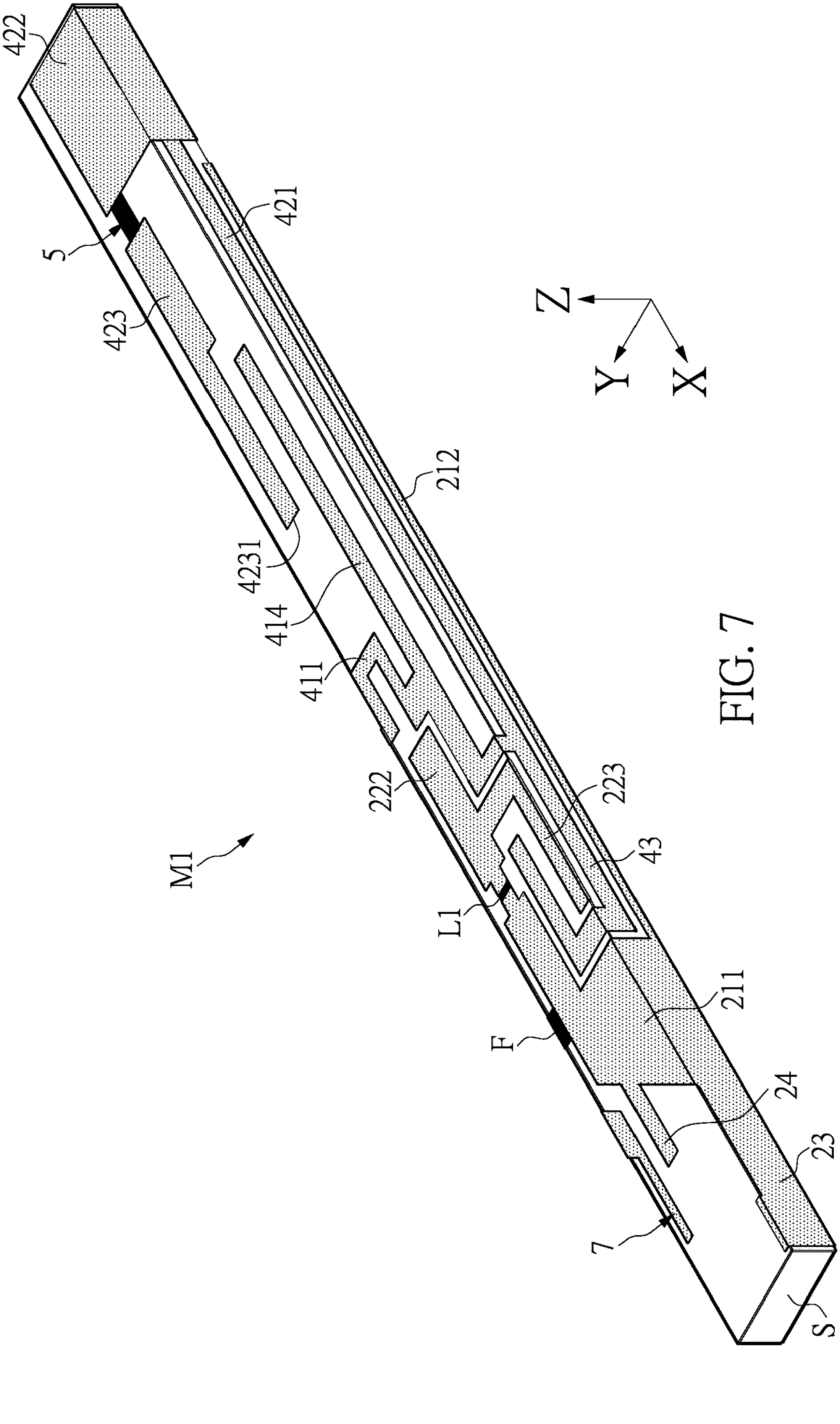
FIG. 7 is a second schematic perspective view of the antenna structure according to the first embodiment of the present disclosure.

Referring to FIG. 6 and FIG. 7, FIG. 6 and FIG. 7 are different schematic perspective views of the antenna structure according to the first embodiment of the present disclosure. A comparison can be made between FIG. 3 and FIGS. 6 and 7. The appearance of the antenna structure M1 is not limited in the present disclosure, and the antenna structure M1 can be disposed on a carrier S of different forms. For example, the antenna structure M1 can be a planar structure as shown in FIG. 3 or a three-dimensional structure as shown in FIGS. 6 and 7. A feed-in point F in FIGS. 6 and 7 is a position where the feeding element 3 is placed. In order to fully exhibit the three-dimensional configuration of the antenna structure M1, the feeding element 3 is omitted from FIGS. 6 and 7. Through the three-dimensional structure, the antenna structure M1 of the present disclosure can be reduced in size, and this is beneficial for the antenna structure M1 to be installed in the electronic device D having a narrow-framed screen. Accordingly, the low frequency range generated by the antenna structure M1 can cover the frequency range from 617 MHz to 960 MHz through the configuration of the switching element 5. Through cooperation with an intermediate frequency range and a high frequency range generated by other radiating elements of the antenna structure M1, the antenna structure M1 can become an LTE full-band antenna that covers a frequency range from 617 MHz to 5,925 MHz.

Second Embodiment

Figure 8:
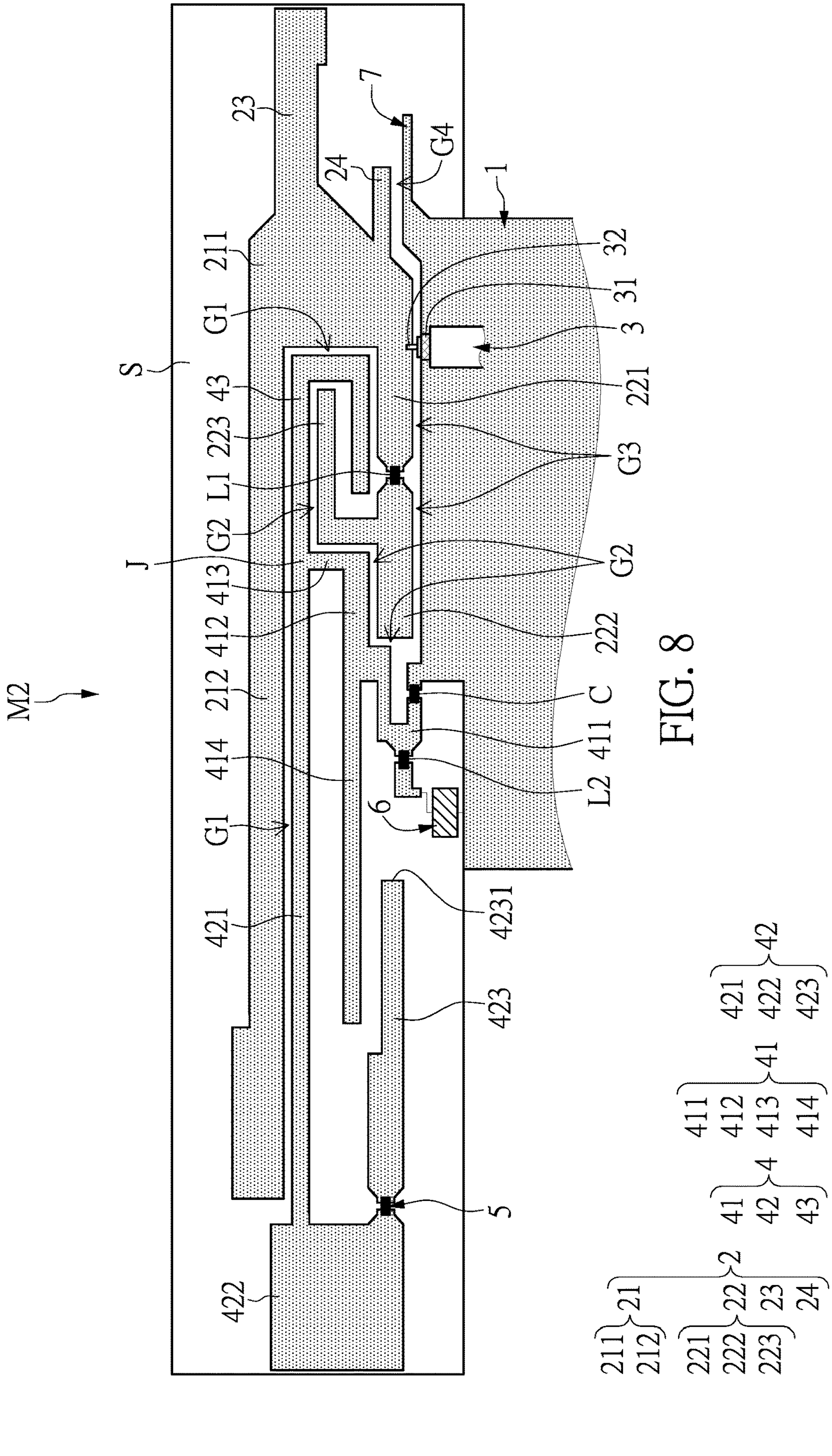
FIG. 8 is a schematic planar view of an antenna structure according to a second embodiment of the present disclosure.

Referring to FIG. 8, FIG. 8 is a schematic planar view of an antenna structure according to a second embodiment of the present disclosure. A second embodiment of the present disclosure provides an antenna structure M2. The antenna structure M2 has a structure similar to that of the antenna structure M1, and the similarities will not be reiterated herein. The main difference between the antenna structure M2 shown in FIG. 8 and the antenna structure M1 shown in FIG. 2 is as follows. The antenna structure M2 further includes a proximity sensing circuit 6, a second inductor L2, and a capacitor C. Furthermore, the proximity sensing circuit 6 can be a capacitance sensing circuit. The proximity sensing circuit 6 is electrically connected between the first extension portion 411 and the grounding element 1, the second inductor L2 is connected between the first extension portion 411 and the proximity sensing circuit 6, and the capacitor C is connected between the first extension portion 411 and the grounding element 1.

In the present disclosure, the first grounding radiation element 4 can serve as a sensing electrode (sensor pad) through the arrangement of the proximity sensing circuit 6, such that the electronic device D can be used to sense whether or not a human body is adjacent to the antenna structure M2. In this way, radiation power of the antenna module M2 can be adjusted, thereby preventing a specific absorption rate (SAR) at which electromagnetic wave energy is absorbed per unit mass by an organism from being too high. It is worth mentioning that, when the antenna structure M2 is implemented as a three-dimensional type as shown in FIG. 6 and FIG. 7, the sensing electrode (the first grounding radiation element 4) covers a top surface of the carrier S parallel to a Y-axis direction and a side surface of the carrier S parallel to a Z-axis direction. When a user uses the electronic device D, these two surfaces of the carrier S are more adjacent to the user. Thus, in the present disclosure, the sensing electrode is so configured as to provide a better sensing range.

In addition, the second inductor L2 can serve as an RF choke to prevent an AC signal generated by the feeding element 3 from flowing into the proximity sensing circuit 6, and to prevent interference between the antenna structure M2 and the proximity sensing circuit 6. An inductance of the second inductor L2 is greater than 18 nH. In the present disclosure, the inductance of the second inductor L2 is 33 nH. The capacitor C can serve as a DC block to prevent a DC signal generated by the proximity sensing circuit 6 from flowing into a system (i.e., an internal circuit of the electronic device D) through the grounding element 1 and affecting or damaging other components inside the electronic device D. A capacitance of the capacitor C is greater than 6 pF. In the present disclosure, the capacitance of the capacitor C is 33 pF. However, the present disclosure is not limited thereto.

Third Embodiment

Figure 9:
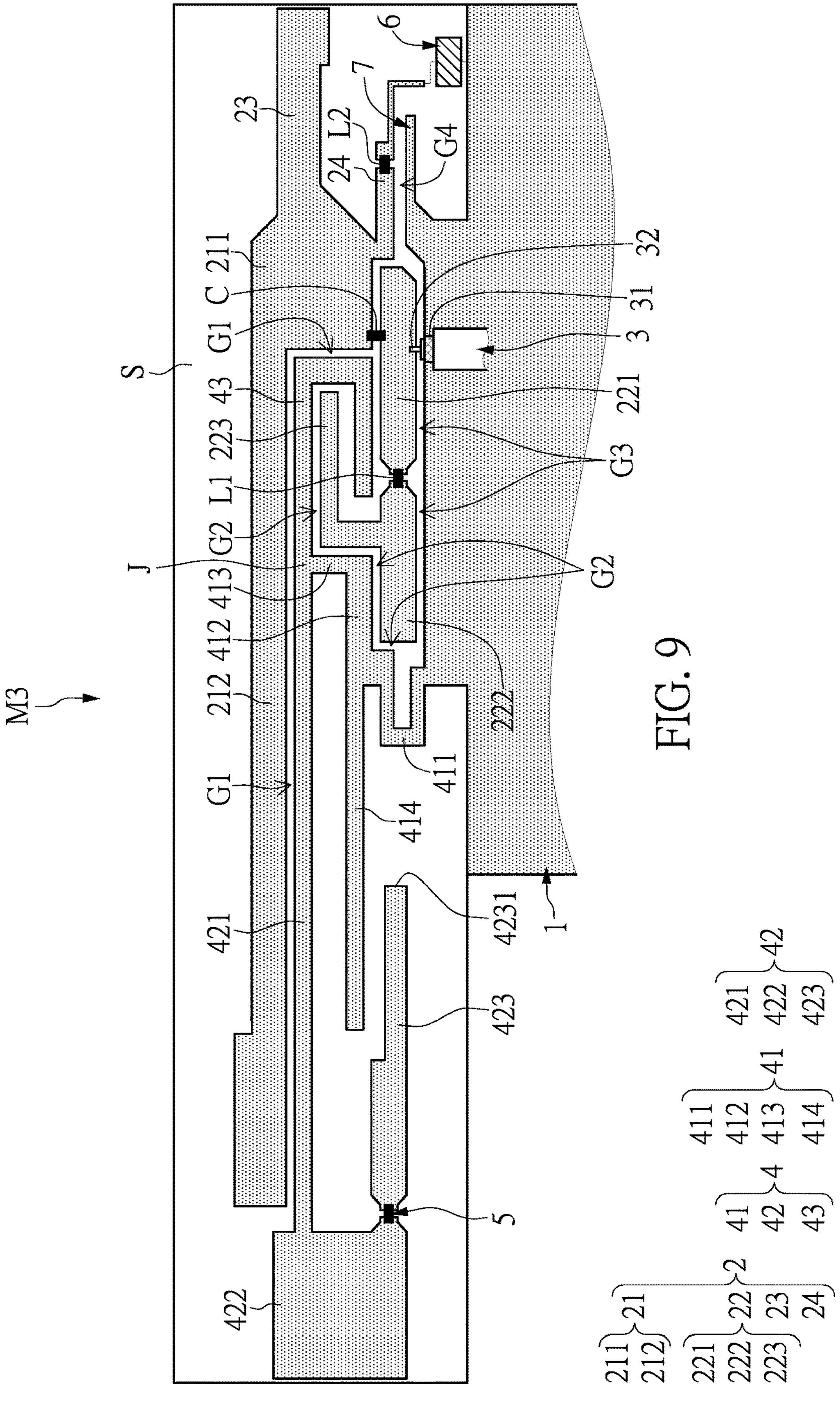
FIG. 9 is a schematic planar view of an antenna structure according to a third embodiment of the present disclosure.

Referring to FIG. 9, FIG. 9 is a schematic planar view of an antenna structure according to a third embodiment of the present disclosure. A third embodiment of the present disclosure provides an antenna structure M3. From a comparison between FIG. 9 and FIG. 8, it can be observed that the main difference between the antenna structure M3 shown in FIG. 9 and the antenna structure M2 shown in FIG. 8 resides in the position of each of the proximity sensing circuit 6, the second inductor L2, and the capacitor C. In the antenna structure M3, the proximity sensing circuit 6 is electrically connected between the fourth radiating portion 24 and the grounding element 1, and the second inductor L2 is connected between the fourth radiating portion 24 and the proximity sensing circuit 6. Moreover, the second radiating portion 22 and the feeding portion 211 are separate from each other, and the capacitor C is connected between the second radiating portion 22 and the feeding portion 211. In the present embodiment, the inductance of the second inductor L2 is 33 nH, and the capacitance of the capacitor C is 33 pF. The second inductor L2 serves as the RF choke to prevent the AC signal generated by the feeding element 3 from flowing into the proximity sensing circuit 6, and to prevent interference between the antenna structure M3 and the proximity sensing circuit 6. The capacitor C serves as the DC block to prevent the DC signal generated by the proximity sensing circuit 6 from flowing into the system (i.e., the internal circuit of the electronic device D) through the feeding element 3 and affecting or damaging other components inside the electronic device D.

Fourth Embodiment

Figure 10:
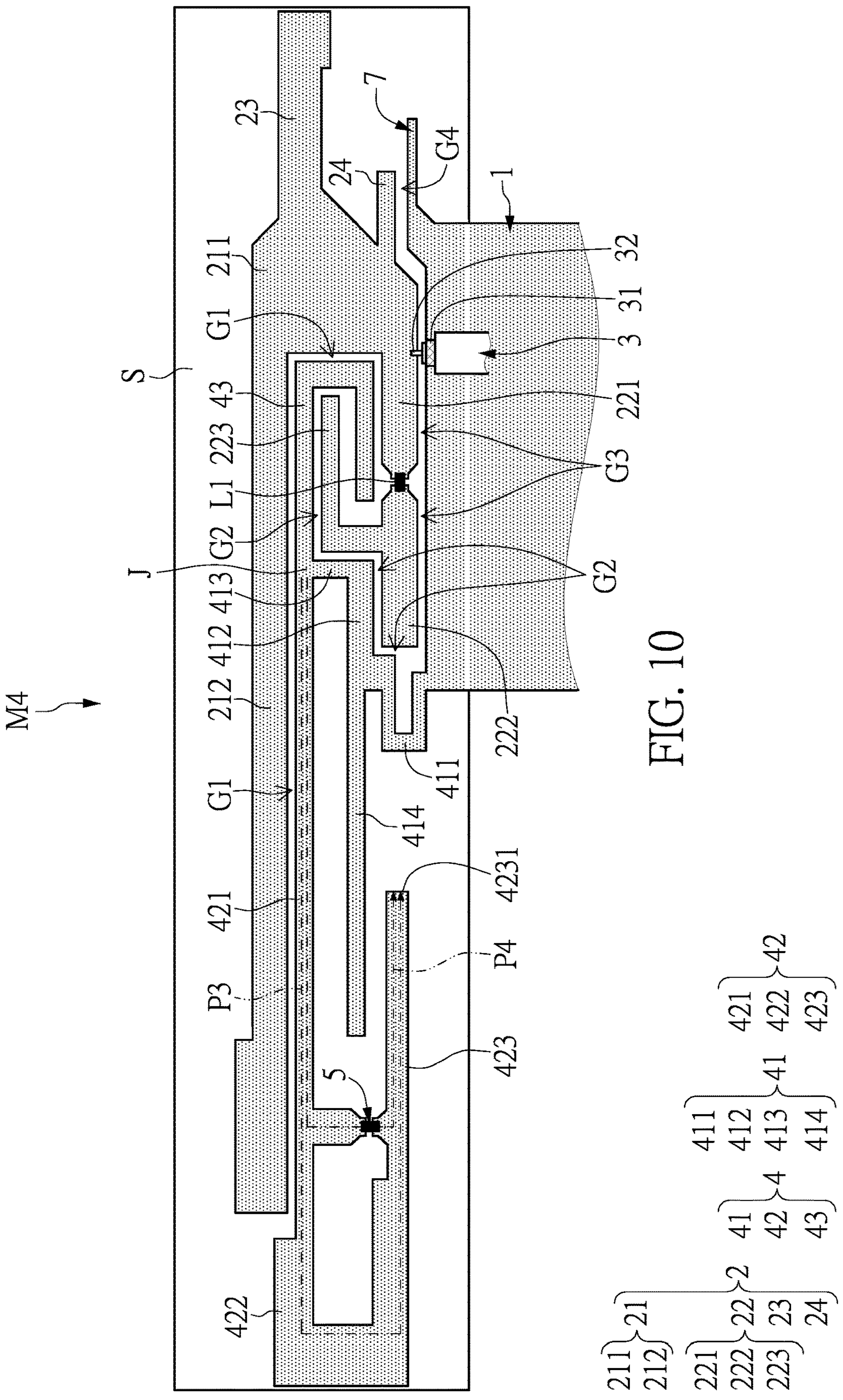
FIG. 10 is a schematic planar view of an antenna structure according to a fourth embodiment of the present disclosure.

Referring to FIG. 10, FIG. 10 is a schematic planar view of an antenna structure according to a fourth embodiment of the present disclosure. A fourth embodiment of the present disclosure provides an antenna structure M4. From a comparison between FIG. 10 and FIG. 3, it can be observed that the antenna structure M4 has a structure similar to that of the antenna structure M1, and the similarities will not be reiterated herein. The main difference between the antenna structure M4 and the antenna structure M1 resides in the position of the switching element 5. In the present embodiment, the switching element 5 is connected between the first section 421 and the third section 423. The switching element 5 can be as shown in FIG. 4, but the second section 422 needs to be replaced with the first section 421. Moreover, the switching element 5 includes the first conducting path W1, the second conducting path W2, the third conducting path W3, and the fourth conducting path W4. The first conducting path W1 has the first switch SW1. The second conducting path W2 has the second switch SW2 and the first capacitor C1. The third conducting path W3 has the third switch SW3 and the second capacitor C2. The fourth conducting path W4 has the fourth switch SW4 and the third capacitor C3. However, in the fourth embodiment, the capacitance of the first capacitor C1 is 47 pF, the capacitance of the second capacitor C2 is 27 pF, and the capacitance of the third capacitor C3 is 7 pF.

When the switching element 5 is switched to the first mode, the first switch SW1, the second switch sW2, the third switch SW3, and the fourth switch SW4 are in the non-conducting state. The signal fed by the feeding element 3 will pass the third path P3 through the feeding portion 211. The third path P3 includes the first section 421, the second section 422, and the third section 423 of the second grounding branch 42. Accordingly, the first radiating portion 21 and the second grounding branch 42 are coupled with each other for generating the first operating frequency band in the low frequency range (617 MHz to 960 MHz). As shown in FIG. 10, the switching element 5 is located in the third path P3. The switching element 5 is more adjacent to the open end 4231 of the third section 423 than the connection point J. In other words, the switching element 5 is located between the central point of the first path P1 and the open end 4231.

When the switching element 5 is switched to the second mode, the third mode, and the fourth mode, the first switch SW1, the second switch SW2, and the third switch SW3 are in the conducting state, and the fourth switch SW4 is in the non-conducting state. The signal fed by the feeding element 3 will pass the fourth path P4 through the feeding portion 211. The fourth path P4 includes a part of the first section 421, a part of the third section 423, and one of the first conducting path W1, the second conducting path W2 (including the first capacitor C1), and the third conducting path W3 (including the second capacitor C2) of the switching element 5. Accordingly, the first radiating portion 21 and the second grounding branch 42 are coupled with each other for generating the second operating frequency band, the third operating frequency band, and the fourth operating frequency band in the low frequency range (617 MHz to 960 MHz).

When the switching element 5 is switched to the fifth mode, the fourth switch SW4 is in the conducting state, and the first switch SW1, the second switch SW2, and the third switch SW3 are in the non-conducting state. The signal fed by the feeding element 3 will pass the fourth path P4 through the feeding portion 211. The fourth path P4 includes a part of the first section 421, a part of the third section 423, and the fourth conducting path W4 (including the third capacitor C3) of the switching element 5. Accordingly, the first radiating portion 21 and the second grounding branch 42 are coupled with each other for generating the fifth operating frequency band in the low frequency range (617 MHz to 960

MHz). It is worth mentioning that, among the central frequencies of the first to fifth operating frequency bands, the central frequency of the first operating frequency band is closest to 617 MHz, and the central frequency of the fifth operating frequency band is closest to 960 MHz.

BENEFICIAL EFFECTS OF THE EMBODIMENTS

In conclusion, in the antenna structures M1 to M4 and the electronic device D provided by the present disclosure, by virtue of "in response to the switching element 5 being switched to a first mode, the first radiating portion 21 and the first grounding radiation element 4 being used to generate a first operating frequency band, and in response to the switching element 5 being switched to a second mode, the first radiating portion 21 and the first grounding radiation element 4 being used to generate a second operating frequency band" and "a central frequency of the first operating frequency band being different from a central frequency of the second operating frequency band," the antenna structures M1 to M4 can satisfy requirements of multiple frequency bands despite miniaturization of the electronic device D.

Furthermore, the antenna structures M1 to M4 provided by the present disclosure can change the signal path by switching between different modes. Then, through the configuration of different capacitors, the antenna structures M1 to M4 can generate the required low frequency bands (i.e., the first to fifth operating frequency bands) within the range of from 617 MHz to 960 MHz. The antenna structures M1 to M4 of the present disclosure further generate the intermediate-high frequency bands through coupling between different radiating elements, and the linkage between the intermediate-high frequency bands and the low frequency bands is extremely low (i.e., the intermediate-high frequency bands are not affected by switching of the low frequency bands). Thus, the antenna structures M1 to M4 can use different low frequency bands to match the intermediate-high frequency bands, so as to generate various frequency band combinations. In this way, an effect of carrier aggregation can be achieved. In addition, through the configuration of the antenna structures M1 to M4 provided by the present disclosure, antenna characteristics can be further optimized to satisfy more stringent antenna specifications.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a grounding element;

a feeding radiation element including a first radiating portion, a second radiating portion, and a third radiating portion, wherein the first radiating portion is connected to the second radiating portion, the first radiating portion includes a feeding portion and an arm, the second radiating portion is more adjacent to the grounding element than the arm, the feeding portion is connected between the arm and the second radiating portion, the third radiating portion is connected to the first radiating portion, the arm extends along a first direction, the third radiating portion extends along a second direction, and the first direction is different from the second direction;

a feeding element including a grounding end and a feeding end, wherein the grounding end is connected to the grounding element, and the feeding end is connected to the feeding portion or the second radiating portion;

a first grounding radiation element connected to the grounding element, wherein the first radiating portion and the second radiating portion jointly surround the first grounding radiation element, and the first radiating portion and the first grounding radiation element are separate from each other and coupled with each other; and a switching element electrically connected to the first grounding radiation element, wherein, in response to the switching element being switched to a first mode, the first radiating portion and the first grounding radiation element are used to generate a first operating frequency band, and in response to the switching element being switched to a second mode, the first radiating portion and the first grounding radiation element are used to generate a second operating frequency band; wherein a central frequency of the first operating frequency band is different from a central frequency of the second operating frequency band.

2. The antenna structure according to claim 1, wherein, in response to the switching element being switched to the first mode, a signal passes through a first path, and in response to the switching element being switched to the second mode, another signal passes through a second path; wherein the first path includes a first capacitor, the second path includes a second capacitor, and a capacitance of the first capacitor is different from a capacitance of the second capacitor.

3. The antenna structure according to claim 1, further comprising a first inductor, wherein the second radiating portion includes a first branch, a second branch, and a third branch, the first branch is connected to the feeding element, the first inductor is connected between the first branch and the second branch, and the third branch is connected to the second branch.

4. The antenna structure according to claim 1, wherein the first grounding radiation element includes a first grounding branch, a second grounding branch, and a third grounding branch, the first grounding branch is connected to the grounding element, and the first grounding branch, the second grounding branch, and the third grounding branch are connected at a connection point.

5. The antenna structure according to claim 4, wherein the second grounding branch includes a first section, a second section, and a third section, the first section is connected to the connection point, the second section is connected between the first section and the third section, the switching element is connected between the second section and the third section, the third section has an open end, and the switching element is more adjacent to the open end than the connection point.

6. The antenna structure according to claim 4, wherein the second grounding branch includes a first section, a second section, and a third section, the first section is connected to the connection point, the second section is connected between the first section and the third section, the switching element is connected between the first section and the third section, the third section has an open end, and the switching element is more adjacent to the open end than the connection point.

7. The antenna structure according to claim 4, wherein the first grounding branch includes a first extension portion, a second extension portion, a third extension portion, and a fourth extension portion, the first extension portion is connected to the grounding element, the second extension portion is connected between the first extension portion and the third extension portion, the third extension portion is connected between the second grounding branch and the third grounding branch, and the fourth extension portion is connected to the first extension portion and extends along the first direction.

8. The antenna structure according to claim 1, wherein the first radiating portion and the first grounding radiation element are separate from each other by a first coupling gap, the second radiating portion and the first grounding radiation element are separate from each other by a second coupling gap, the grounding element and the second radiating portion are separate from each other by a third coupling gap, and a distance of any part of the first coupling gap, the second coupling gap, and the third coupling gap is smaller than or equal to 3 mm.

9. The antenna structure according to claim 8, further comprising a second grounding radiation element, wherein the second grounding radiation element is connected to the grounding element, the feeding radiation element further includes a fourth radiating portion, the fourth radiating portion is connected to the first radiating portion and adjacent to the second grounding radiation element, the fourth radiating portion and the second grounding radiation element are separate from each other by a fourth coupling gap, and a distance of any part of the fourth coupling gap is smaller than or equal to 3 mm.

10. An antenna structure, comprising:

a grounding element;

a feeding radiation element including a first radiating portion, a second radiating portion, and a third radiating portion, wherein the first radiating portion is connected to the second radiating portion, the first radiating portion includes a feeding portion and an arm, the second radiating portion is more adjacent to the grounding element than the arm, the feeding portion is connected between the arm and the second radiating portion, the third radiating portion is connected to the first radiating portion, the arm extends along a first direction, the third radiating portion extends along a second direction, and the first direction is different from the second direction;

a feeding element including a grounding end and a feeding end, wherein the grounding end is connected to the grounding element, and the feeding end is connected to the feeding portion or the second radiating portion;

a first grounding radiation element connected to the grounding element, wherein the first radiating portion and the second radiating portion jointly surround the first grounding radiation element, and the first radiating portion and the first grounding radiation element are separate from each other and coupled with each other; and a switching element electrically connected to the first grounding radiation element, wherein, in response to the switching element being switched to a first mode, the first radiating portion and the first grounding radiation element are used to generate a first operating frequency band, and in response to the switching element being switched to a second mode, the first radiating portion and the first grounding radiation element are used to generate a second operating frequency band; wherein a central frequency of the first operating frequency band is different from a central frequency of the second operating frequency band.

11. The electronic device according to claim 10, wherein, in response to the switching element being switched to the first mode, a signal passes through a first path, and in response to the switching element being switched to the second mode, another signal passes through a second path; wherein, the first path includes a first capacitor, the second path includes a second capacitor, and a capacitance of the first capacitor is different from a capacitance of the second capacitor.

12. The electronic device according to claim 10, further comprising a first inductor, wherein the second radiating portion includes a first branch, a second branch, and a third branch, the first branch is connected to the feeding element, the first inductor is connected between the first branch and the second branch, and the third branch is connected to the second branch.

13. The electronic device according to claim 10, wherein the first grounding radiation element includes a first grounding branch, a second grounding branch, and a third grounding branch, the first grounding branch is connected to the grounding element, and the first grounding branch, the second grounding branch, and the third grounding branch are connected at a connection point.

14. The electronic device according to claim 13, wherein the second grounding branch includes a first section, a second section, and a third section, the first section is connected to the connection point, the second section is connected between the first section and the third section, the switching element is connected between the second section and the third section, the third section has an open end, and the switching element is more adjacent to the open end than the connection point.

15. The electronic device according to claim 13, wherein the second grounding branch includes a first section, a second section, and a third section, the first section is connected to the connection point, the second section is connected between the first section and the third section, the switching element is connected between the first section and the third section, the third section has an open end, and the switching element is more adjacent to the open end than the connection point.

16. The electronic device according to claim 13, wherein the first grounding branch includes a first extension portion, a second extension portion, a third extension portion, and a fourth extension portion, the first extension portion is connected to the grounding element, the second extension portion is connected between the first extension portion and the third extension portion, the third extension portion is connected between the second grounding branch and the third grounding branch, and the fourth extension portion is connected to the first extension portion and extends along the first direction.

17. The electronic device according to claim 16, further comprising a proximity sensing circuit, a second inductor, and a capacitor, wherein the proximity sensing circuit is electrically connected between the first extension portion and the grounding element, the second inductor is connected between the first extension portion and the proximity sensing circuit, and the capacitor is connected between the first extension portion and the grounding element.

18. The electronic device according to claim 10, wherein the first radiating portion and the first grounding radiation element are separate from each other by a first coupling gap, the second radiating portion and the first grounding radiation element are separate from each other by a second coupling gap, the grounding element and the second radiating portion are separate from each other by a third coupling gap, and a distance of any part of the first coupling gap, the second coupling gap, and the third coupling gap is smaller than or equal to 3 mm.

19. The electronic device according to claim 18, further comprising a second grounding radiation element, wherein the second grounding radiation element is connected to the grounding element, the feeding radiation element further includes a fourth radiating portion, the fourth radiating portion is connected to the first radiating portion and adjacent to the second grounding radiation element, the fourth radiating portion and the second grounding radiation element are separate from each other by a fourth coupling gap, and a distance of any part of the fourth coupling gap is smaller than or equal to 3 mm.

20. The electronic device according to claim 19, further comprising a proximity sensing circuit, a second inductor, and a capacitor, wherein the proximity sensing circuit is electrically connected between the fourth radiating portion and the grounding element, the second inductor is connected between the fourth radiating portion and the proximity sensing circuit, and the capacitor is connected between the second radiating portion and the feeding portion.

* * * * *